Sept. 17, 1940.　　　　J. J. SOW　　　　2,215,020
PERPETUAL CALENDAR
Filed April 27, 1938
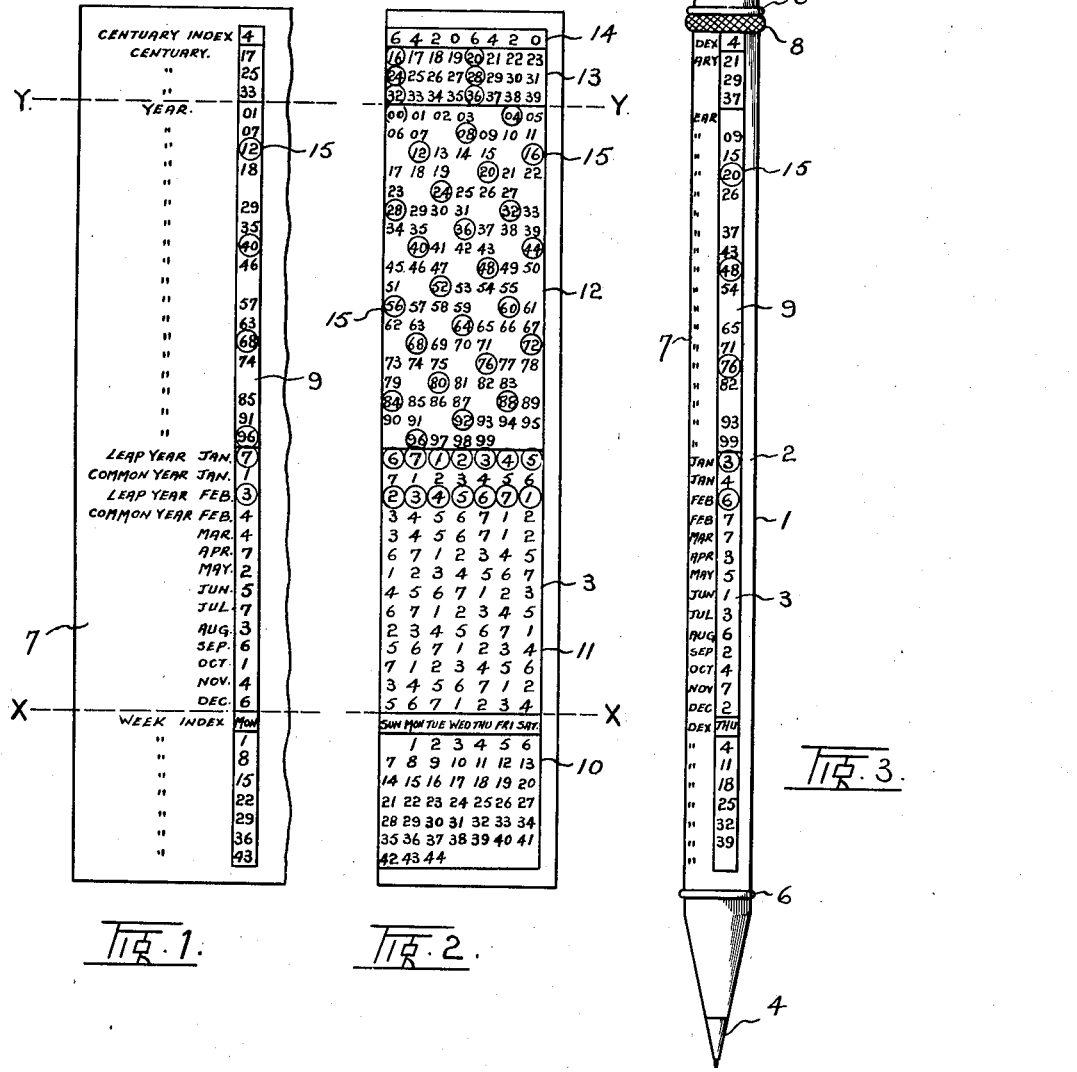
INVENTOR.
JUNG JIN SOW.
ATTORNEY.

Patented Sept. 17, 1940

2,215,020

UNITED STATES PATENT OFFICE 2,215,020

PERPETUAL CALENDAR

Jung Jin Sow, Vancouver, British Columbia, Canada

Application April 27, 1938, Serial No. 204,571

1 Claim. (Cl. 40—111)

My invention relates to improvements in perpetual calendars, the objects of which are to provide means whereby the day of any date of any year within the scope of the calendar may be quickly determined by one or two movements of a scale or chart; to provide a calendar in the form of a cylindrical body having a vertical viewing opening in which the date in question and the day sought may be found, and to provide means whereby leap years and the month indexes of leap years are defined, so that days of a leap year are as accurately found as the days of a common year.

The invention consists essentially of a cylindrical body having upon its periphery a column of rows of numbers representing years and index numbers and a sleeve having a vertical slot or viewing opening adapted to selectively expose one column of said figures, said sleeve having indicia adjacent the slot for indicating the numbers in the exposed column to be read, as will be more fully described in the following specification and shown in the accompanying drawing, in which—

Fig. 1 is an elevation of a portion of the sleeve showing the viewing opening and the indicia.

Fig. 2 is an elevation of the periphery of the cylindrical body extended to a plane surface and showing the reference characters.

Fig. 3 is an elevation of the invention as adapted for use in combining with a pencil.

In the drawing like characters of reference indicate corresponding parts in each figure.

The numeral 1, see Figure 3, indicates a pencil of any desired type and having a cylindrical body portion 2 on the periphery of which a chart 3 is displayed, the chart is preferably of the same transverse dimension as the circumference of the body 2.

Adjacent the pencil point 4 and towards the upper end 5 of the pencil projecting collars 6 are fitted, and between the collars a sleeve 7 is fitted, as shown in Figure 1. One or more knurled bands 8 may be fitted to the sleeve adjacent the collars 6 to facilitate the turning of said sleeve 7 about the chart 3 to display the information sought from the calendar in a vertical slot or viewing opening 9 formed in said sleeve.

The chart 3, see Figure 2, consists of superposed rows of numbers forming superposed columns as follows: The numeral 10 indicates a column of rows of "day" index numbers which is surmounted with the days of the week or abbreviations thereof, each full row of numbers in this column consisting of seven figures. The numeral 11 indicates a column of rows of "month" index numbers, each full row of numbers consisting of seven figures. The numeral 12 indicates a column of rows of "year" numbers indicating the year of the century as say 1 to 99, each full row again consisting of seven figures. The numeral 13 indicates a column of rows of century numbers such as 16 to 39, the number 16 referring to the century of 1600 to 1699, each full row in this column consisting of eight figures. The numeral 14 indicates the century index which consists of eight numbers in a single row.

The column 13 and the column 14 are only used when the calendar is designed to cover a period of more than one hundred years, in this particular case the period covered is from 1600 A. D. to 3999 A. D.

The year index numbers for leap years are identified by using a contrasting colour or by encircling the number as at 15 in columns 11 and 12. It will be noticed that fourteen rows of figures are used in column 11 giving the indices of each month and for the months of January and February which are affected by leap years. The indices of January of a leap year and April and July of any year are alike, likewise that the indices for February, March and November of any common year are alike, consequently it would be possible to consolidate this column by giving one index line to more than one month.

To one side of the viewing opening 9 on the sleeve 7 words defining the meaning of the rows of numbers in the several columns, such as "Century index" referring to the numbers in row 14; "Century" referring to the centuries 16 to 39 as in column 13, and "Year" referring to the years 00 to 99 of any century, as in column 12. Each row in column 11 is headed with the name of a month such as Leap Year January, Common Year January, Leap Year February, Common Year February, March, April, May, June, July, August, September, October, November and December and refers to the index numbers of any particular month.

The use of the calendar is as follows: Assuming that it is desired to find what day of the week June 2, 1906, was, the pencil is turned within the sleeve 7 until in the column 13 the number 19 indicating the nineteenth century appears in the viewing opening 9. Above this number 19 in the century index row 14 the index 0 will appear. The pencil is then turned to display in the viewing opening the number 06, thus completing the year number 1906. With the number 06 displayed it is found that the index number on the June line of column 11 is 4, so by adding the index to the day of the month sought, viz; index 4 and day 2 equals 6, it suffices to turn the pencil within the sleeve to find in column 10 the number 6 and above it read the day sought which is Saturday. To find February 10, 1896, we disclose century number 18 and get the century index 2, next we turn to the year number 96 and find it to be a leap year, since the number is encircled, in reading down the viewing opening to Leap Year February, we find the index number 3 encircled, so that by adding the century index 2 and the month index 3 and the day of the month sought 10 we get a total of 15, so the day above the number 15 is disclosed as being Monday. In short, the sum of the indexes displayed in the viewing opening for any given date when added to the day of the month give the key to be used in column 10 to show the day of the week of the given date.

It will be found that many desired days of dates may be found by simply moving the sleeve to display the desired index and that a greatly increased number can be found by moving the sleeve first to the century index and then the year number, and that any other days of dates may be had by moving the sleeve to read century index, year number and day index. As instances of the above, 1st January 1900 is found to be Sunday by setting the sleeve to disclose "00" in the year index. The 7th May 1600 is read by exposing 16 in the century column, the indexes shown, in this case 6, 1, plus 7 for the day, making 14 which gives Sunday as the day of the date given. 25th February 1879 can be found by two moves, and 26th February 1879 can be found by three moves, which are the greatest number of moves necessary to find the day of any date required.

It will be obvious that the invention may be adapted for mounting upon table lamp standards and other ornaments as well as on a pencil.

While the sleeve 7 is shown as being a single sleeve, it will be obvious that it could be divided into three aligned portions at the dotted lines X and Y, one to include columns 10 only, another to include 11 and 12 and the uppermost to include columns 13 and 14. By this means all the indexes necessary to finding any desired day could be left in position of display in the viewing opening until the date sought was found.

What I claim as my invention is:

A perpetual calendar comprising a cylindrical body having superposed columns of numbers upon the periphery and a row showing the seven days of the week, said columns including day indexes, month indexes for from January to December of any common year and January and February of any leap year, year numbers century year numbers and century indexes, said day indexes being surmounted by the days of the week, a single sleeve rotatable about the body, said sleeve having a vertical viewing opening adapted to display a century year number and a century index and to display superposed numbers in each of the remaining columns, and characters upon said sleeve for identifying the numbers sought in the viewing opening, said indexes being such that the sum of the century index, together with the month index displayed simultaneously with the showing of the year sought, together with the date of the month sought will when found in the day index column show the day of the week of the date sought.

JUNG JIN SOW.